(12) United States Patent
Renz

(10) Patent No.: US 10,738,410 B2
(45) Date of Patent: Aug. 11, 2020

(54) ROTATING COMPONENT OF A LAUNDRY APPLIANCE WITH A HELICAL SEAM

(71) Applicant: Haier US Appliance Solutions, Inc., Wilmington, DE (US)

(72) Inventor: Daniel Stephen Renz, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 40 days.

(21) Appl. No.: 16/053,874

(22) Filed: Aug. 3, 2018

(65) Prior Publication Data

US 2020/0040513 A1 Feb. 6, 2020

(51) Int. Cl.
| | |
|---|---|
| *D06F 58/04* | (2006.01) |
| *B23K 26/244* | (2014.01) |
| *B23K 9/032* | (2006.01) |
| *D06F 37/04* | (2006.01) |

(52) U.S. Cl.
CPC ............ *D06F 58/04* (2013.01); *B23K 9/0325* (2013.01); *B23K 26/244* (2015.10); *D06F 37/04* (2013.01)

(58) Field of Classification Search
CPC ....... D06F 58/04; D06F 37/04; B23K 26/244; B23K 9/0325
USPC .................................................. 34/595–610
See application file for complete search history.

(56) References Cited

U.S. PATENT DOCUMENTS

| | | | | | |
|---|---|---|---|---|---|
| 1,842,154 | A | * | 1/1932 | Dunham | D06F 23/02 68/25 |
| 2,257,932 | A | * | 10/1941 | Basler | D06F 13/00 68/134 |
| 2,575,876 | A | * | 11/1951 | Kausch | B01D 46/2411 55/296 |
| 4,048,820 | A | * | 9/1977 | Pielemeier | D06F 13/00 68/123 |
| 4,068,503 | A | * | 1/1978 | Platt | D06F 13/00 366/243 |
| 4,198,916 | A | * | 4/1980 | dePolo | A41D 1/007 112/470.17 |
| 5,771,604 | A | * | 6/1998 | Wunderlich | D06F 58/02 34/603 |
| 7,448,146 | B2 | * | 11/2008 | Cho | B01D 45/12 34/601 |
| 7,506,425 | B2 | | 3/2009 | Kim | |
| 9,487,898 | B2 | * | 11/2016 | He | D06F 35/00 |
| 9,803,304 | B2 | * | 10/2017 | Obregon | D06F 13/02 |
| 9,803,305 | B2 | * | 10/2017 | Obregon | D06F 13/02 |

(Continued)

FOREIGN PATENT DOCUMENTS

| | | | | | |
|---|---|---|---|---|---|
| CA | 2566270 | C | * | 7/2014 | .......... D21F 1/0054 |
| DE | 10348837 | A1 | * | 5/2005 | .......... D06F 58/203 |

(Continued)

*Primary Examiner* — Stephen M Gravini
(74) *Attorney, Agent, or Firm* — Dority & Manning, P.A.

(57) ABSTRACT

A laundry appliance defines a vertical direction, a lateral direction and a transverse direction that are mutually perpendicular to one another. The laundry appliance includes a cabinet defining an opening. A clothes vessel is rotatably mounted within the cabinet. The clothes vessel comprises a base and a hoop with a helical seam extending around the hoop. The clothes vessel is configured for receiving laundry articles to be rotated therein via the opening of the cabinet.

18 Claims, 12 Drawing Sheets

(56) References Cited

U.S. PATENT DOCUMENTS

| | | | | |
|---|---|---|---|---|
| 2003/0167804 A1* | 9/2003 | Yoon | ............ | D06F 37/02 |
| | | | | 68/232 |
| 2008/0110042 A1* | 5/2008 | Ackermann | ............ | D06F 58/04 |
| | | | | 34/487 |
| 2009/0071028 A1* | 3/2009 | Gadke | ............ | D06F 95/006 |
| | | | | 34/108 |
| 2012/0248887 A1* | 10/2012 | Kesler | ............ | H03H 7/40 |
| | | | | 307/104 |

FOREIGN PATENT DOCUMENTS

| | | | | | |
|---|---|---|---|---|---|
| DE | 102004055942 A1 * | 5/2006 | ............ | D06F 58/04 |
| JP | 2002200399 A | 7/2002 | | |
| JP | 4909890 B2 * | 4/2012 | ............ | D21F 1/0054 |
| WO | WO-2005040485 A1 * | 5/2005 | ............ | D06F 58/203 |
| WO | WO-2005113889 A1 * | 12/2005 | ............ | D21F 1/0054 |

\* cited by examiner

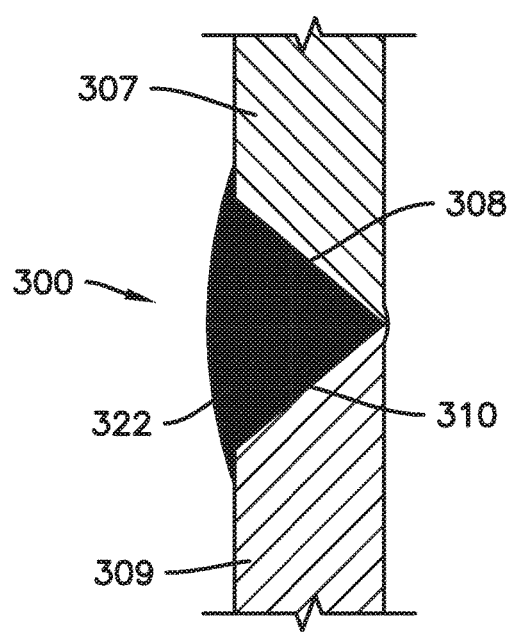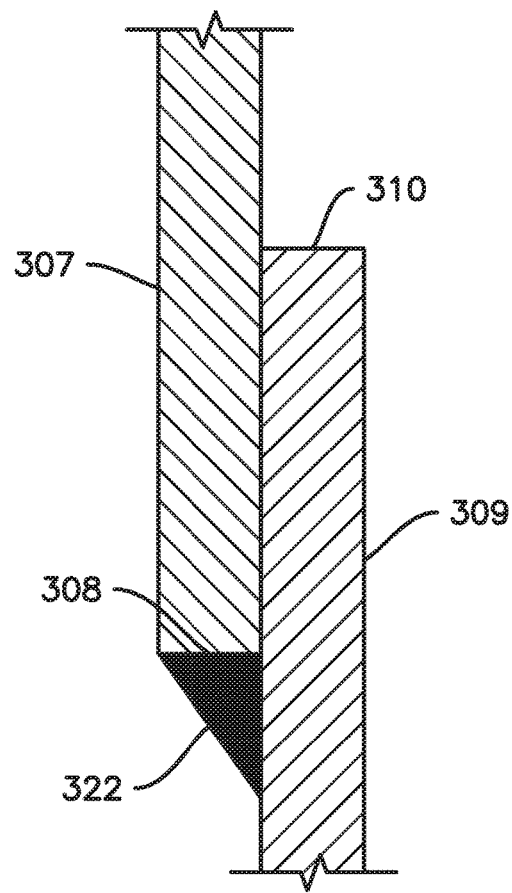
Fig. 10
Fig. 11

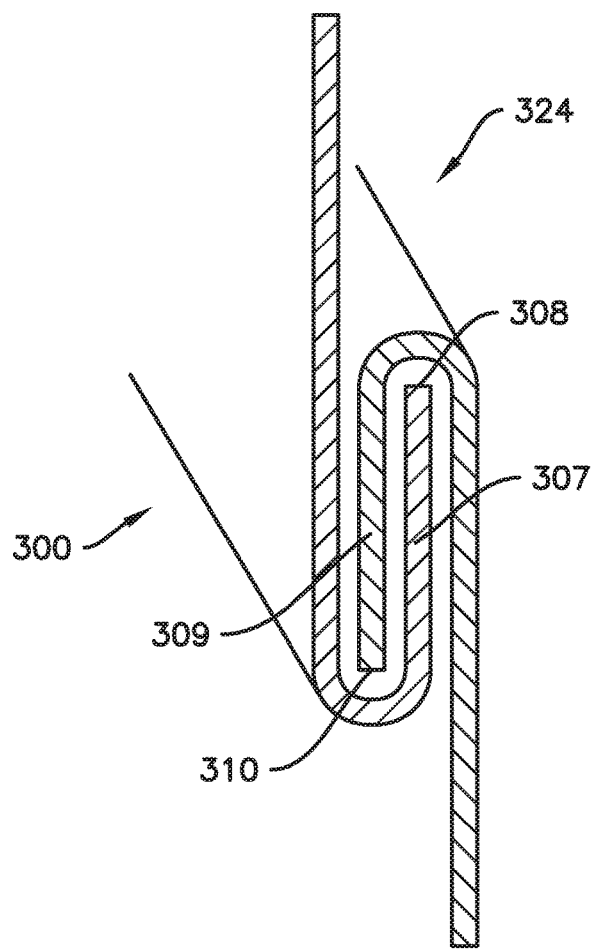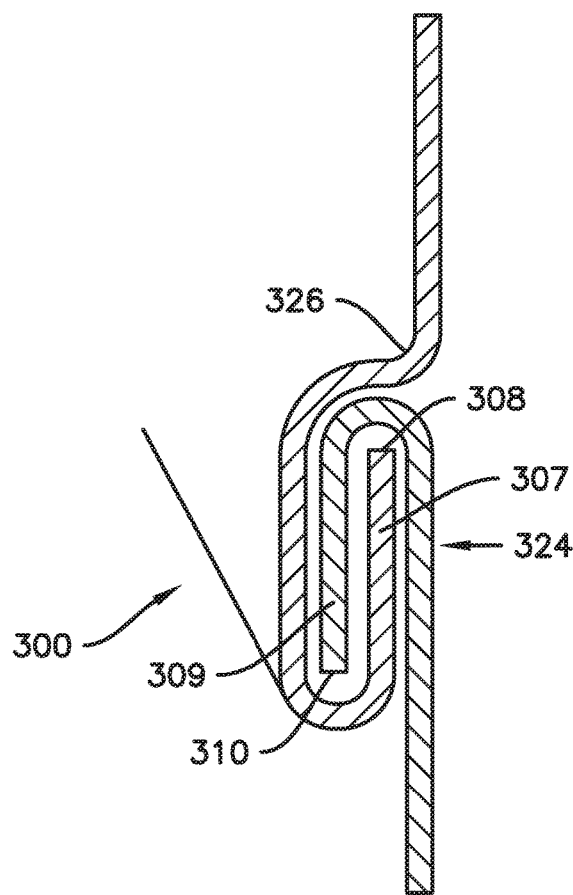
Fig. 12                    Fig. 13

ROTATING COMPONENT OF A LAUNDRY APPLIANCE WITH A HELICAL SEAM

FIELD OF THE INVENTION

The present subject matter relates generally to laundry appliances, such as washing machine appliances and/or dryer appliances, including rotating components of such appliances having a helical seam and related methods.

BACKGROUND OF THE INVENTION

Various laundry appliances generally include a rotatable clothes vessel therein. For example, washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket can rotate at various speeds to agitate articles within the wash chamber, to wring wash fluid from articles within the wash chamber, etc.

As another example, the rotatable clothes vessel may be a drum of a clothes dryer appliance. A conventional appliance for drying articles such as a clothes dryer (or laundry dryer) for drying clothing articles typically includes a cabinet having a rotating drum for tumbling clothes and laundry articles therein. One or more heating elements heat air prior to the air entering the drum, and the warm air is circulated through the drum as the clothes are tumbled to remove moisture from laundry articles in the drum. Gas or electric heating elements may be used to heat the air that is circulated through the drum.

Such rotating vessels, e.g., a basket of a washing machine appliance or a drum of a dryer appliance, are usually constructed with a straight line seam, such as an axial seam extending along or parallel to an axial direction of the vessel. If such an axial seam of the vessel were to separate instantaneously over an entire or substantially entire length of the seam, particularly during rotation of the clothes vessel, the instantaneous separation could result in the separated portion of the vessel impacting other components of the laundry appliance. In such instances, the momentum of the vessel, especially during high-speed rotation, may result in a sudden and complete separation of the seam, and subsequently impact on neighboring components.

Accordingly, a rotating component for a laundry appliance which provides improved durability and/or a more gradual separation of the seam should such separation occur, would be desired.

BRIEF DESCRIPTION OF THE INVENTION

Aspects and advantages of the invention will be set forth in part in the following description, or may be apparent from the description, or may be learned through practice of the invention.

In one aspect, a laundry appliance is provided. The laundry appliance defines a vertical direction, a lateral direction and a transverse direction that are mutually perpendicular to one another. The laundry appliance includes a cabinet defining an opening. A clothes vessel is rotatably mounted within the cabinet. The clothes vessel comprises a base and a hoop with a helical seam extending around the hoop. The clothes vessel is configured for receiving laundry articles to be rotated therein via the opening of the cabinet.

In another aspect, a method of making a rotatable clothes vessel for a laundry appliance is provided. The method includes helically wrapping a rectangular strip of material. The method also includes joining adjacent portions of the helically wrapped strip to form a tube with a helical seam extending around the tube. The method further includes cutting a portion of the tube to form a hoop of the rotatable clothes vessel, and joining the hoop to a base to form the rotatable clothes vessel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 provides a schematic illustration of an exemplary seam comprising a butt weld joint such as may be provided on the rotatable clothes vessel of FIG. 9 according to one or more exemplary embodiments of the present subject matter.

FIG. 11 provides a schematic illustration of an exemplary seam comprising a lap weld joint such as may be provided on the rotatable clothes vessel of FIG. 9 according to one or more exemplary embodiments of the present subject matter.

FIG. 12 provides a schematic illustration of an exemplary seam comprising a folded joint such as may be provided on the rotatable clothes vessel of FIG. 9 according to one or more exemplary embodiments of the present subject matter.

FIG. 13 provides a schematic illustration of an exemplary seam comprising a folded and crimped joint such as may be provided on the rotatable clothes vessel of FIG. 9 according to one or more exemplary embodiments of the present subject matter.

DETAILED DESCRIPTION

Figure 1:
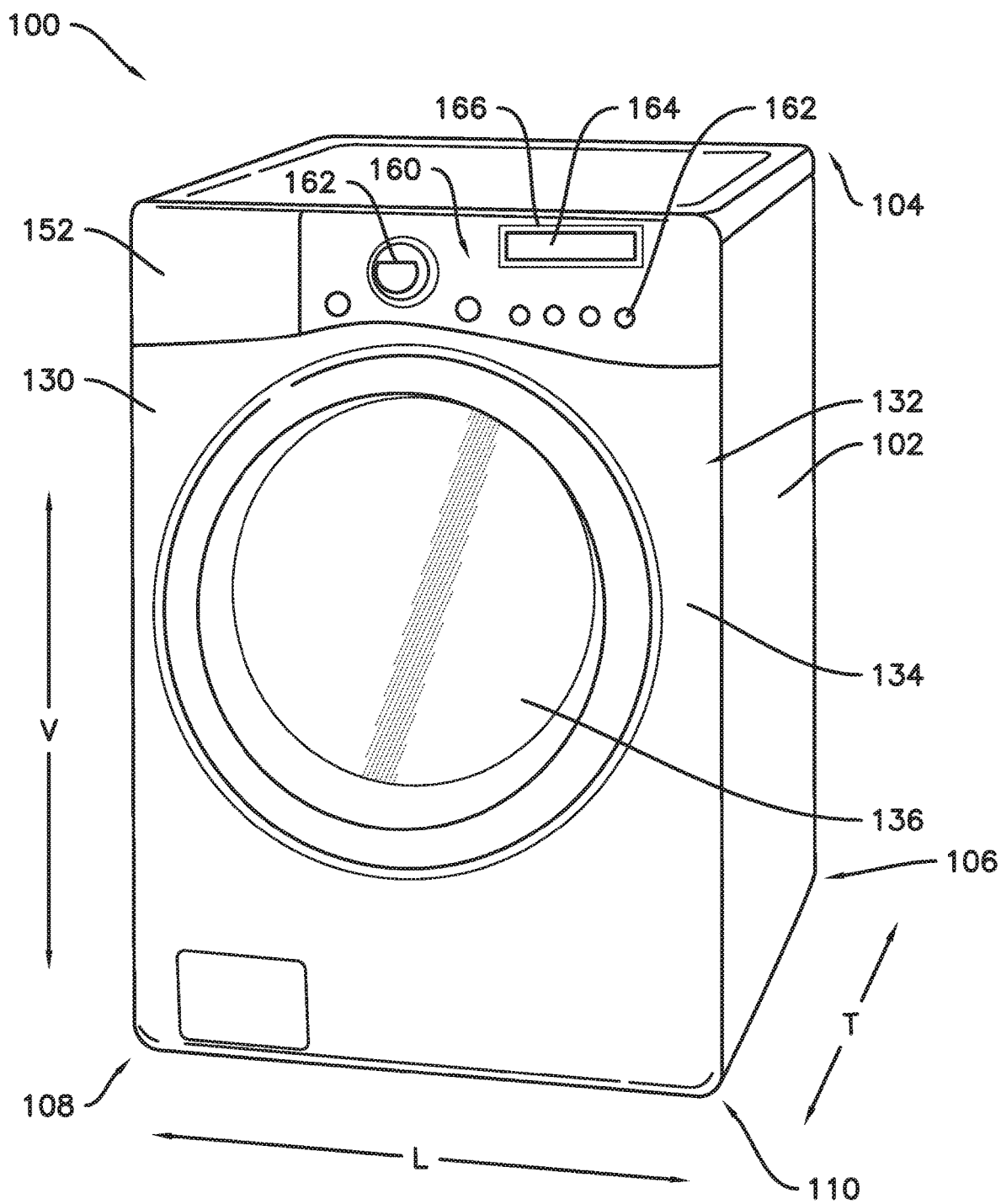
FIG. 1 provides a perspective view of an exemplary washing machine appliance according to one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
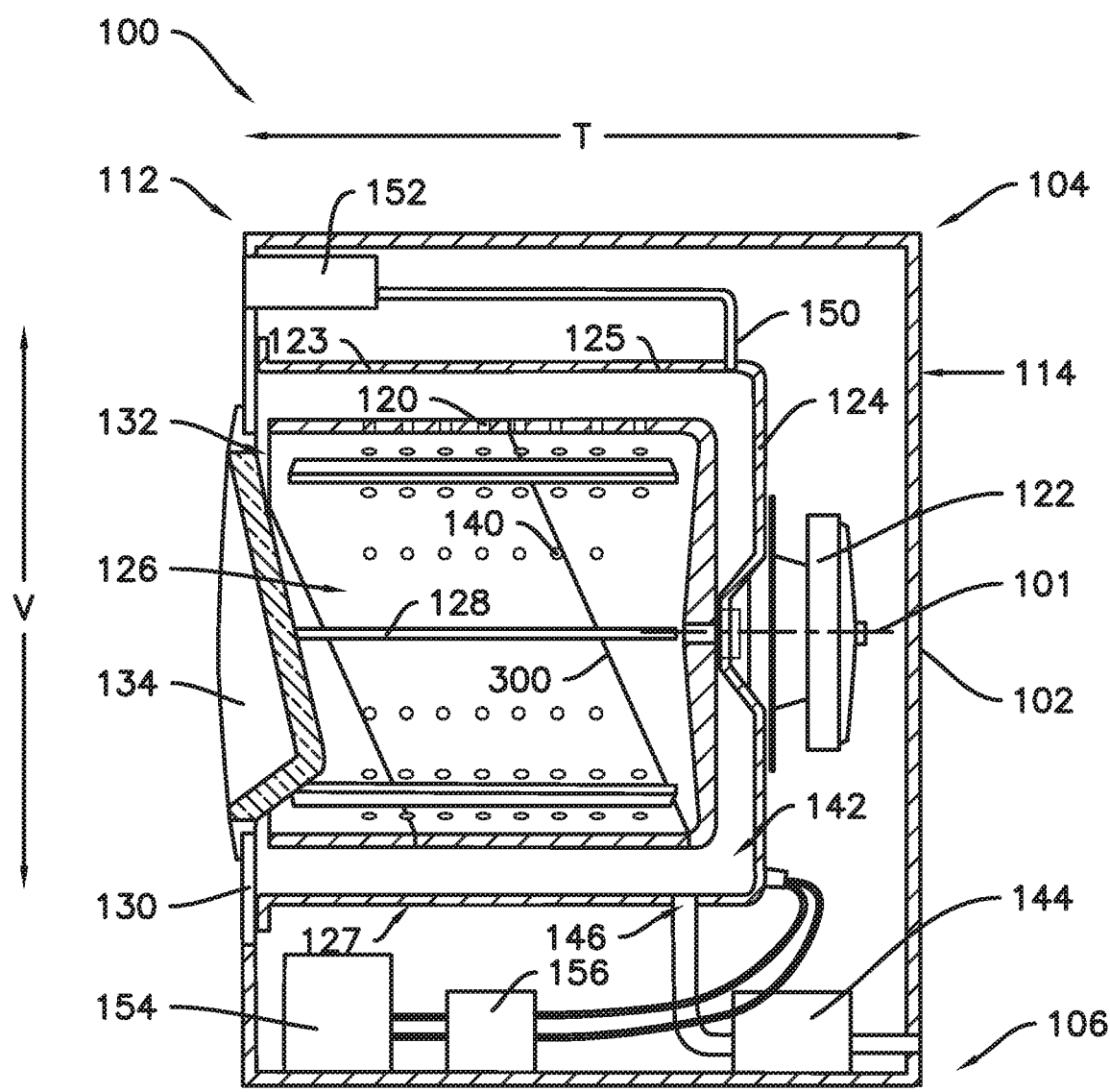
FIG. 2 provides a side cross-sectional view of the exemplary washing machine appliance of FIG. 1.

Referring now to the figures, FIG. 1 is a perspective view of an exemplary washing machine appliance 100 and FIG. 2 is a side cross-sectional view of the washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 (FIG. 2) and a rear 114 (FIG. 2) along the transverse direction T.

Referring to FIG. 2, a wash tub 124 is non-rotatably mounted within cabinet 102. As may be seen in FIG. 2, the wash tub 124 defines a central axis 101. The central axis 101 extends along an axial direction A (FIG. 9), and the tub 124 also defines a radial direction R (FIG. 9) perpendicular to the central axis 101. In the example embodiment illustrated by FIG. 2, the central axis 101 may be oriented generally along or parallel to the transverse direction T of the washing machine appliance 100. Accordingly, the washing machine appliance 100 may be referred to as a horizontal axis washing machine.

Referring again to FIG. 2, in some embodiments, the rotatable clothes vessel 316 (FIG. 9) may be a wash basket 120 rotatably mounted within the tub 124 such that the wash basket 120 is rotatable about an axis of rotation, which generally coincides with central axis 101 of the tub 124. As may be seen in FIG. 2, the wash basket 120 may include a helical seam 300 extending around a cylindrical portion of the wash basket 120. The cylindrical portion may be referred to as a hoop, see, e.g., hoop 318 in FIG. 9, as described below. A motor 122, e.g., such as a pancake motor, is in mechanical communication with wash basket 120 to selectively rotate wash basket 120 (e.g., during an agitation or a rinse cycle of washing machine appliance 100). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 100.

Wash basket 120 may define one or more agitator features that extend into wash chamber 126 to assist in agitation and cleaning of articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 within wash tub 124. More specifically, washing machine appliance 100 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 100. According to the illustrated embodiment, detergent drawer 152 may also be fluidly coupled to spout 150 to facilitate the complete and accurate dispensing of wash additive.

Additionally, a bulk reservoir 154 is disposed within cabinet 102. Bulk reservoir 154 is also configured for receipt of fluid additive for use during operation of washing machine appliance 100 (shown in FIG. 1). Bulk reservoir 154 is sized such that a volume of fluid additive sufficient for a plurality or multitude of wash cycles of washing machine appliance 100 (e.g., five, ten, twenty, fifty, or any other suitable number of wash cycles) may fill bulk reservoir 154. Thus, for example, a user can fill bulk reservoir 154 with fluid additive and operate washing machine appliance 100 for a plurality of wash cycles without refilling bulk reservoir 154 with fluid additive. A reservoir pump 156 is configured for selective delivery of the fluid additive from bulk reservoir 154 to wash tub 124.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 150 and/or detergent drawer 152. One or more valves (not shown) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances such as washing machine appliance 200 illustrated in FIGS. 3 and 4 and described in further detail below.

Figure 3:
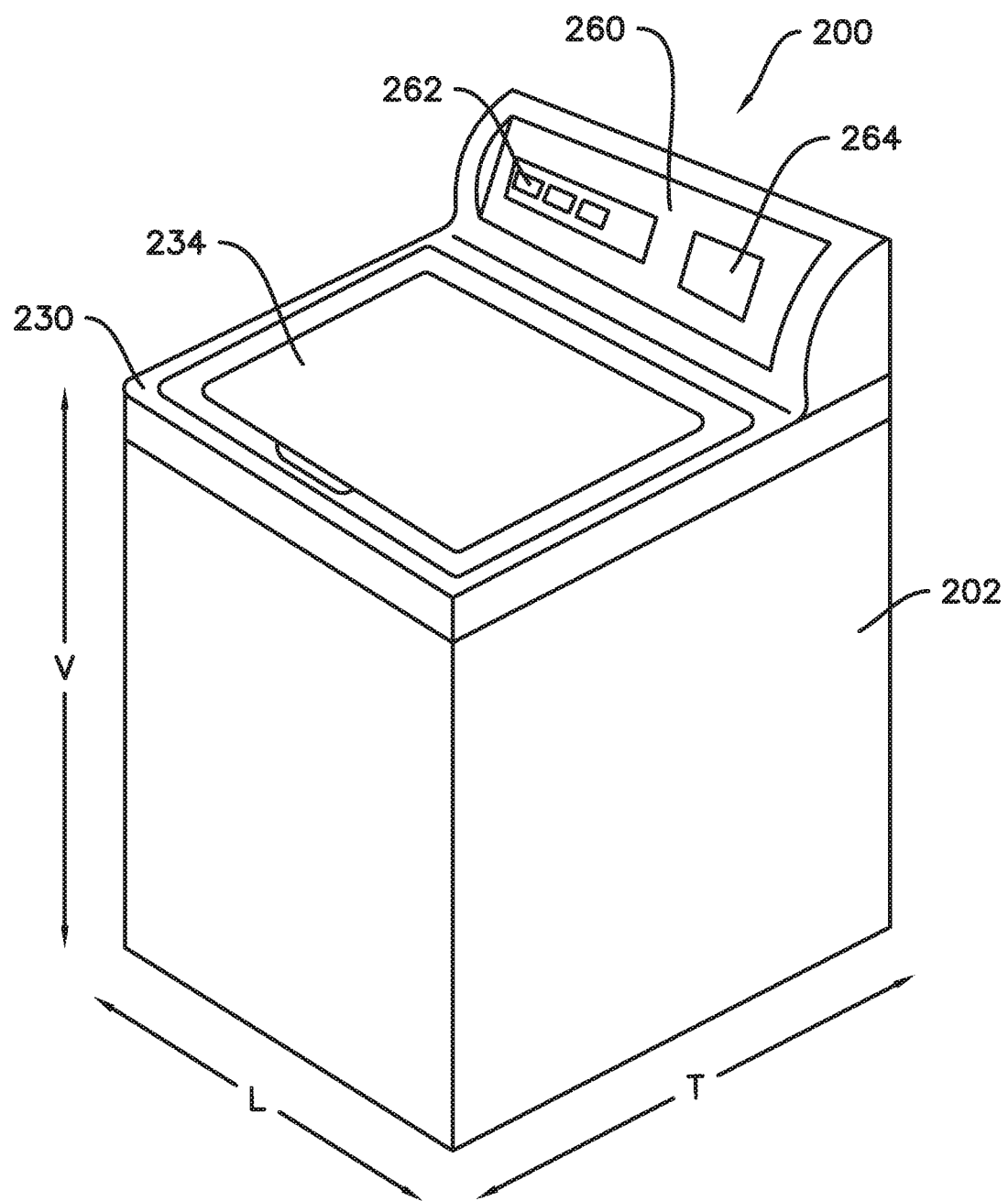
FIG. 3 provides a perspective view of another exemplary washing machine appliance according to one or more exemplary embodiments of the present subject matter.
Figure 4:
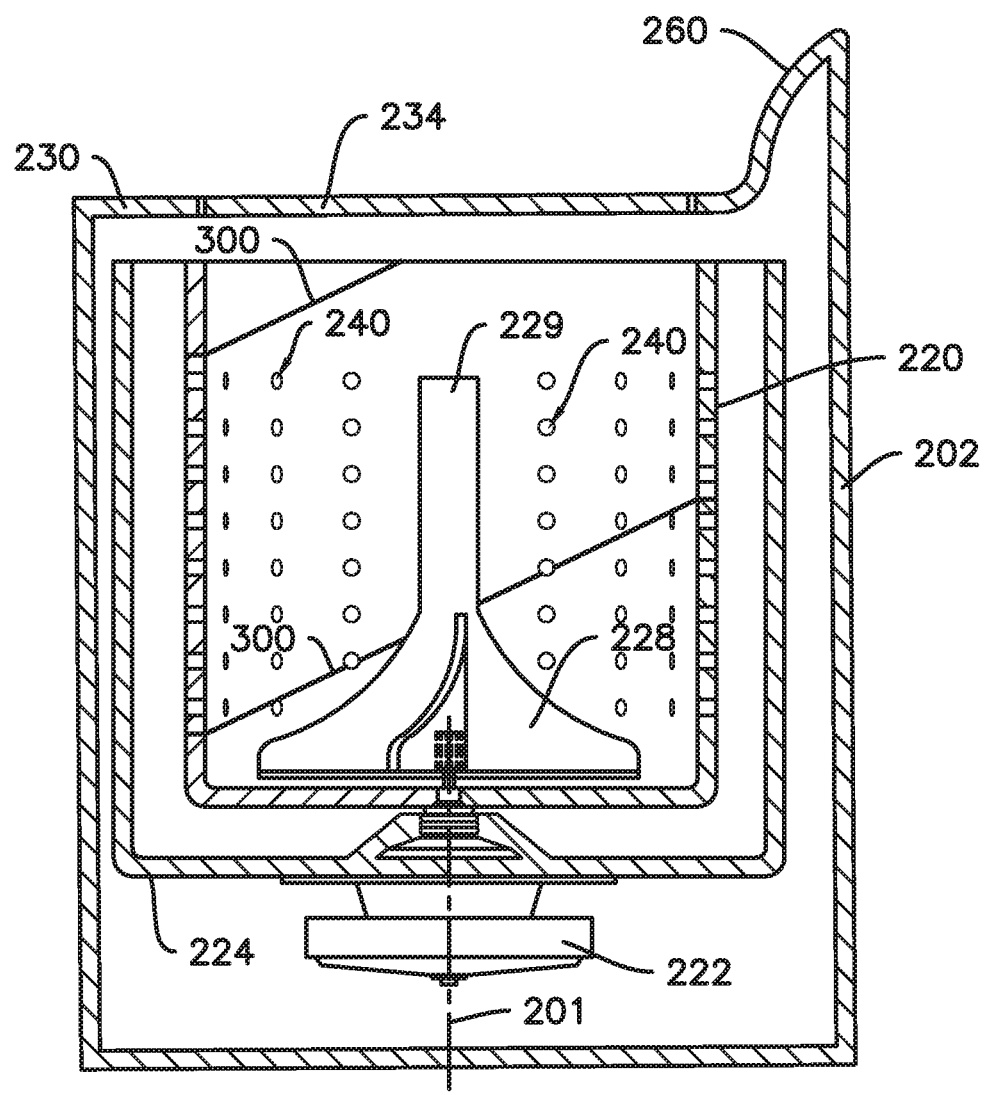
FIG. 4 provides a side cross-sectional view of the exemplary washing machine appliance of FIG. 3.

As shown in FIGS. 3 and 4, in some example embodiments of the present disclosure the rotatable clothes vessel 316 (FIG. 9) may be a basket 220 of a vertical axis washing machine 200 having a helical seam 300. In particular, in the example embodiment illustrated by FIGS. 3 and 4, the central axis 201 of the wash tub 224 is oriented generally along or parallel to the vertical direction V of the washing machine appliance 200. Accordingly, the washing machine appliance 200 may be referred to as a vertical axis washing machine.

The washing machine appliance 200 may be configured generally similarly to the washing machine appliance 100 described above. For example, as seen in FIG. 3, the washing machine appliance 200 may generally define a vertical direction V, a lateral direction L, and a transverse direction T, each of which is mutually perpendicular. Washing machine appliance 200 may include a cabinet 202 with a door or lid 234 provided in a top panel 230 of the cabinet 202. Additionally, a control panel 260 may be provided on the cabinet 202, and may include a plurality of input selectors 262 and a display 264.

As shown in FIG. 4, the washing machine appliance 200 may include a tub 224 non-rotatably mounted within the cabinet 202 and a wash basket 220 rotatably mounted within the tub 224. A motor 222, e.g., such as a pancake motor, is in mechanical communication with wash basket 220 to selectively rotate wash basket 220 (e.g., during an agitation or a rinse cycle of washing machine appliance 200). Wash basket 220 may define one or more agitator features to assist in agitation and cleaning of articles disposed within wash basket 220 during operation of washing machine appliance 200. For example, as illustrated in FIG. 4, a plurality of ribs 228 extends within basket 220 and are circumferentially disposed around a shaft 229. Wash basket 220 may also define a plurality of perforations 240 in order to facilitate fluid communication between an interior of basket 220 and wash tub 224.

Figure 5:
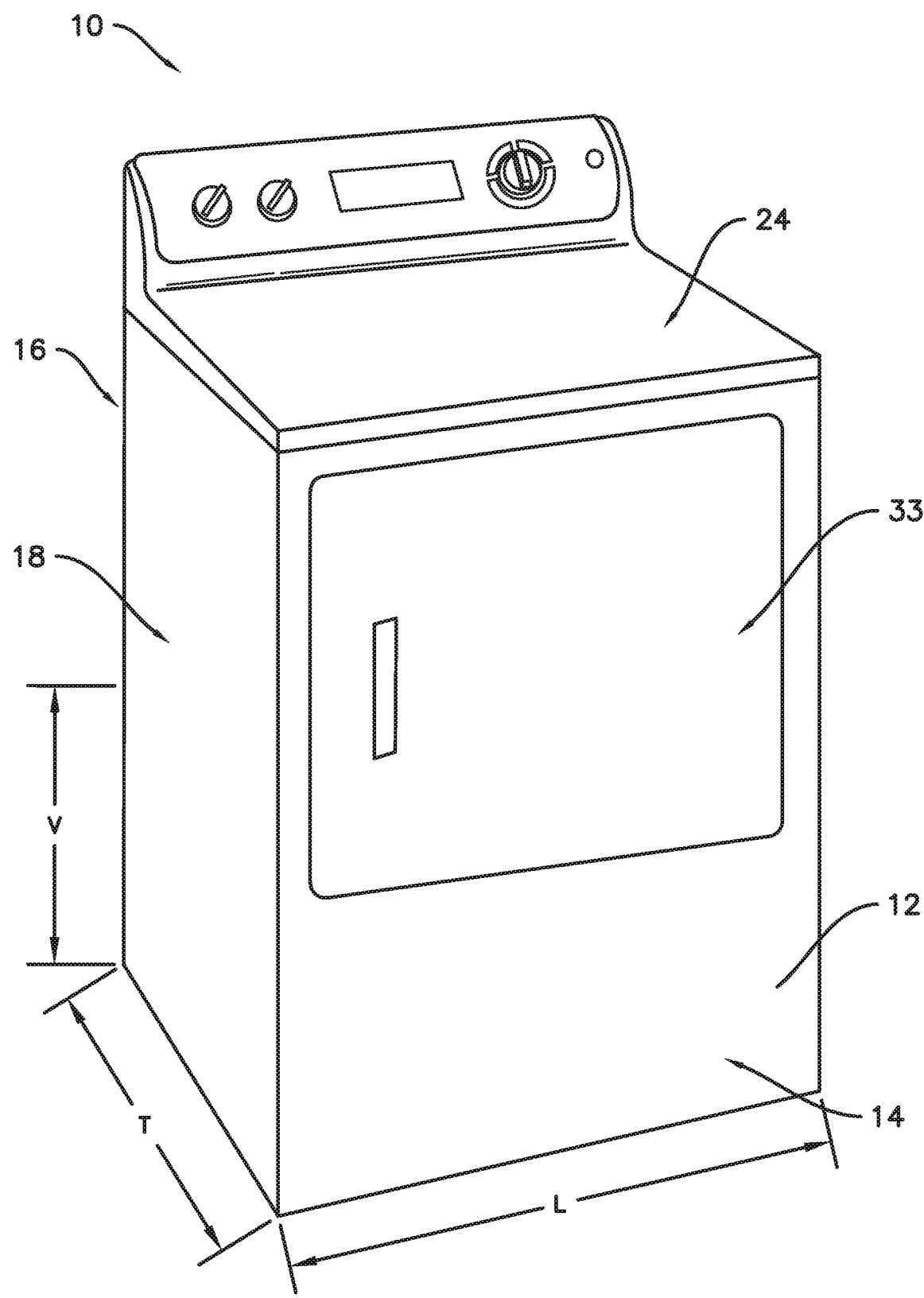
FIG. 5 provides a perspective view of a dryer appliance in accordance with one or more additional exemplary embodiments of the present disclosure.
Figure 6:
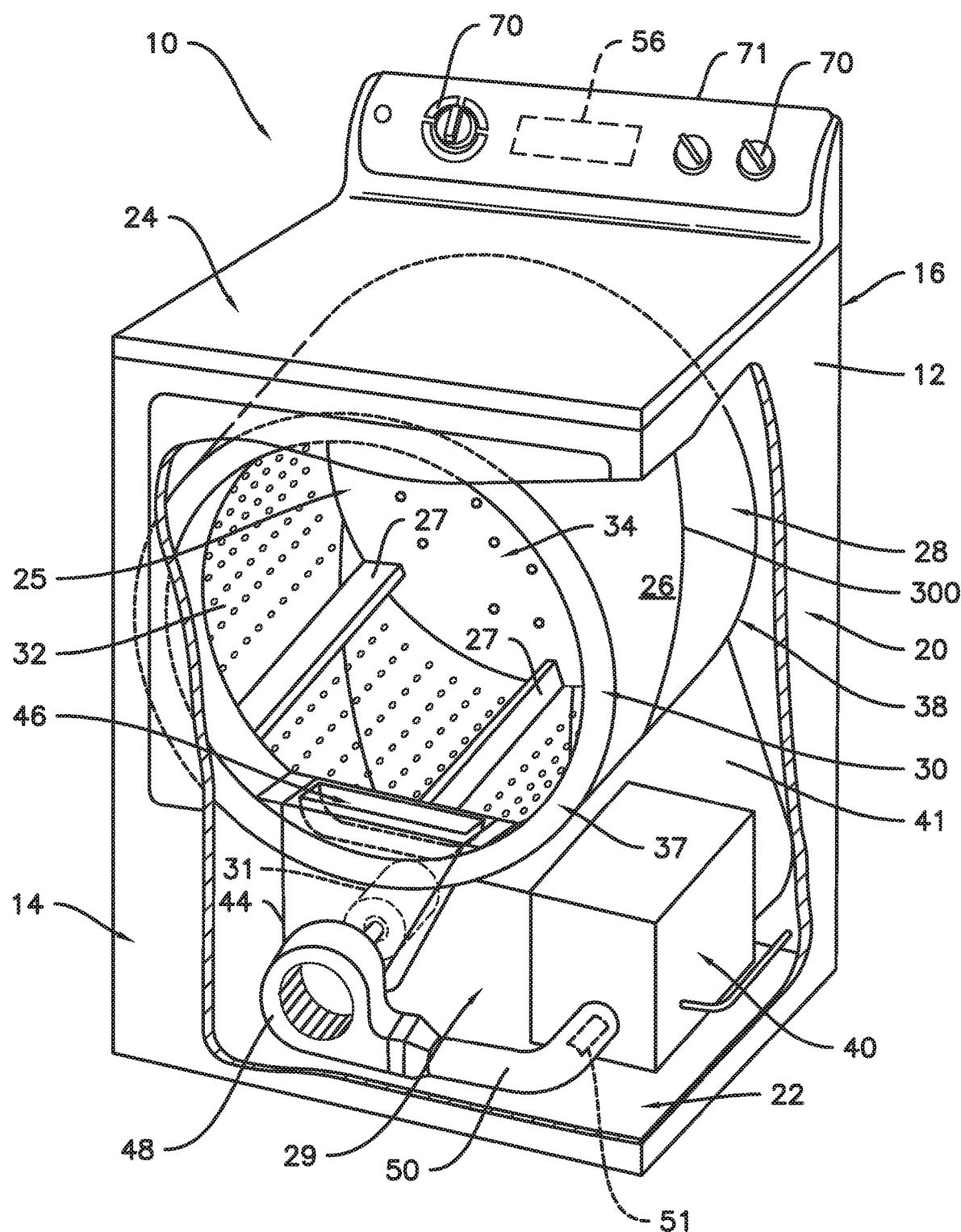
FIG. 6 provides a perspective view of the example dryer appliance of FIG. 5 with portions of a cabinet of the dryer appliance removed to reveal certain components of the dryer appliance.

Turning now to FIGS. 5 and 6, in additional example embodiments, the laundry appliance may be a dryer appliance 10 and the rotatable clothes vessel 316 (FIG. 9) may be a drum 26 of the dryer appliance 10 having a helical seam 300. FIG. 5 provides a perspective view of dryer appliance 10 according to exemplary embodiments of the present disclosure. FIG. 6 provides another perspective view of dryer appliance 10 with a portion of a cabinet or housing 12 of dryer appliance 10 removed in order to show certain components of dryer appliance 10. Dryer appliance 10 generally defines a vertical direction V, a lateral direction L, and a transverse direction T, each of which is mutually perpendicular, such that an orthogonal coordinate system is defined. While described in the context of a specific embodiment of dryer appliance 10, using the teachings disclosed herein, it will be understood that dryer appliance 10 is provided by way of example only. Other dryer appliances having different appearances and different features, e.g., a vertical axis dryer appliance, may also be utilized with the present subject matter as well.

Cabinet 12 includes a front panel 14, a rear panel 16, a pair of side panels 18 and 20 spaced apart from each other by front and rear panels 14 and 16, a bottom panel 22, and a top cover 24. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40. Additionally, a temperature sensor 51 (FIG. 6) such as a thermistor or any other suitable temperature sensor may be provided to sense a temperature of the heating system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 10 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. As shown, the helical seam 300 may extend around the cylindrical wall 28. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

Drum 26 includes a rear wall 34 rotatably supported within main housing 12 by a suitable fixed bearing. Rear wall 34 can be fixed or can be rotatable. Rear wall 34 may include, for instance, a plurality of holes that receive hot air that has been heated by a heat pump or refrigerant based heating system 40, as will be described further below. Moisture laden, heated air is drawn from drum 26 by an air handler, such as blower fan 48, which generates a negative air pressure within drum 26. The air passes through a duct 44 enclosing screen filter 46, which traps lint particles. As the air passes from blower fan 48, it enters a duct 50 and then is passed into heating system 40. Heating system 40 may be or include a heat pump including a sealed refrigerant circuit, as described in more detail below with reference to FIG. 3. Heated air (with a lower moisture content than was received from drum 26), exits heating system 40 and returns to drum 26 by duct 41. After the clothing articles have been dried, they are removed from the drum 26 via opening 32. A door 33 provides for closing or accessing drum 26 through opening 32.

In some embodiments, one or more selector inputs 70, such as knobs, buttons, touchscreen interfaces, etc., may be provided or mounted on a cabinet 12 (e.g., on a backsplash 71) and are in operable communication (e.g., electrically coupled or coupled through a wireless network band) with a processing device or controller 56. Controller 56 may also be provided in operable communication with motor 31, blower 48, or heating system 40. In turn, signals generated in controller 56 direct operation of motor 31, blower 48, or heating system 40 in response to the position of inputs 70. As used herein, "processing device" or "controller" may refer to one or more microprocessors, microcontroller, ASICS, or semiconductor devices and is not restricted necessarily to a single element. The controller 56 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations.

Figure 7:
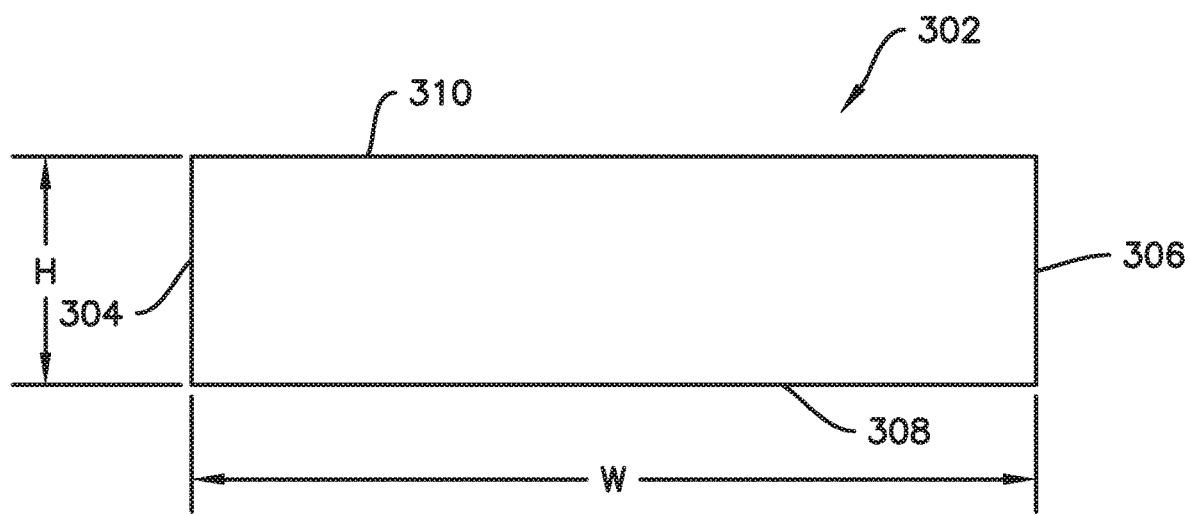
FIG. 7 provides an elevation view of a rectangular strip of material as may be used in one or more exemplary embodiments of the present subject matter.

Turning now to FIG. 7, in some embodiments, the rotatable clothes vessel may be formed from a rectangular strip of material 302. The material may be a metallic material, such as stainless steel. The rectangular strip of material 302 may extend between a left side 304 and a right side 306 and may define a width W between the left side 304 and the right side 306. As will be understood, the left side 304 and the right side 306 may be generally parallel. The rectangular strip of material 302 may extend between a bottom side 308 and a top side 310 and may define a height H between the bottom side 308 and the top side 310. As will be understood due to the rectangular nature of the strip 302, the bottom side 308 and the top side 310 may be generally parallel to each other and perpendicular to the left side 304 and the right side 306.

Figure 8:
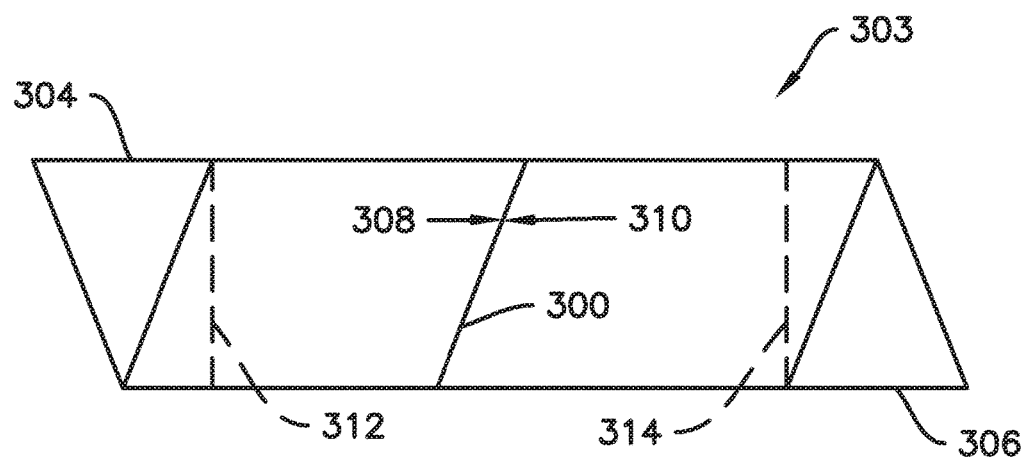
FIG. 8 provides an elevation view of a tube as may be formed from the rectangular strip of material of FIG. 7.
Figure 9:
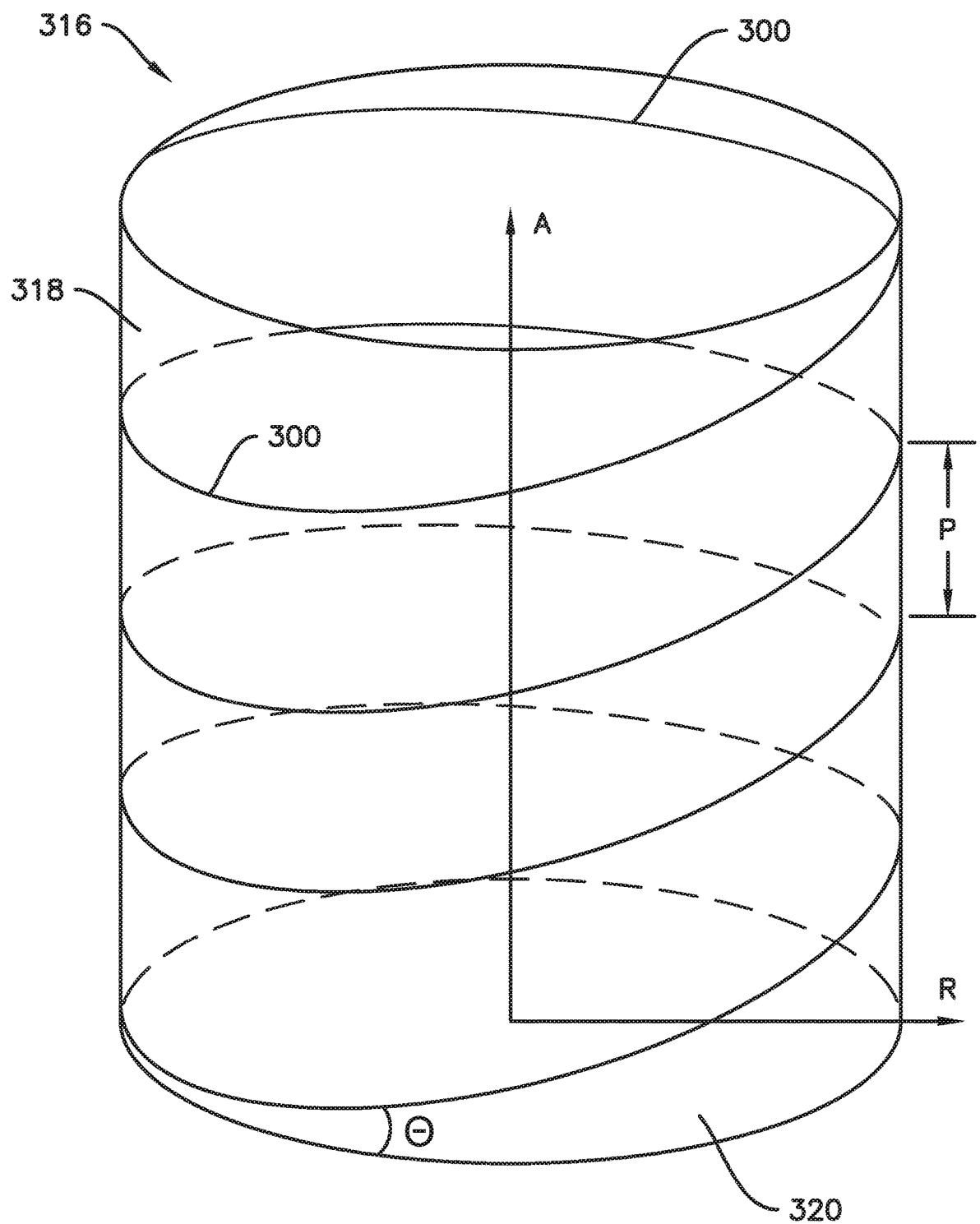
FIG. 9 provides a perspective view of an exemplary rotatable clothes vessel for a laundry appliance according to one or more exemplary embodiments of the present subject matter.

As shown in FIG. 8, the rectangular strip of material 302 may be helically wrapped around itself to form a tube 303 with a helical seam 300 extending around the tube 303. As may be seen in FIG. 8, after helically wrapping the strip 302 (FIG. 7), the left side 304 and the right side 306 may be rotated relative to their respective positions in the starting form of FIG. 7. The helical seam 300 may be defined where the bottom edge 308 adjoins or is adjacent to the top edge 310 after helically wrapping the strip 302 of FIG. 7 to form the tube 303 of FIG. 8. Such adjacent or adjoining portions of the edges 308 and 310 may be joined together, e.g., by welding, folding, crimping, and/or adhering, as described in more detail below, to form the helical seam 300. The tube 303 may have end portions removed, e.g., by cutting along lines 312 and 314, as shown in FIG. 8, to form at least one open-ended cylindrical hoop 318 (FIG. 9). In various embodiments, more than one hoop 318 may be formed from a single tube 303. For example, one or more additional cuts between and parallel to the lines 312 and 314 may be made to form two, three, or more hoops 318 from the tube 303.

As shown in FIG. 9, the rotatable clothes vessel 316 may include the cylindrical hoop 318 with the helical seam 300 extending around the cylindrical hoop 318, and a base 320 may be joined to one of the open ends of the cylindrical hoop 318 to form the rotatable clothes vessel 316. The rotatable clothes vessel 316 may define an axial direction A and a radial direction R perpendicular to the axial direction A. The helical seam 300 may define an angle Θ, e.g., with respect to the radial direction R. Adjacent turns of the helical seam 300 may be spaced apart along the axial direction A by a pitch P. The angle Θ may determine the length of the seam 300, e.g., if Θ is about 90°, the seam 300 will be relatively short, and the length of the seam 300 will increase as Θ approaches 0°. In embodiments of the present disclosure, Θ may be any suitable angle greater than 0° and less than 90°. For example, Θ may be between about 5° and about 60°, such as about 45°. In some embodiments, an angle Θ of about 45° or less may advantageously result in approximately a 30% reduction in seam stress, which would be significant relative to fatigue life.

As shown in FIGS. 10 and 11, in some embodiments, the helical seam 300 may be defined by a weld joint 322 between a first adjacent portion 307 proximate the bottom edge 308 and a second adjacent portion 309 proximate the top edge 310. For example, as shown in FIG. 10, the weld joint 322 may be a butt weld joint formed by abutting the bottom edge 308 and the top edge 310 against each other and forming the weld joint 322 at the abutting interface of the edges 308 and 310. In embodiments including a butt weld joint, the edges 308 and 310 may be chamfered, e.g., as shown in FIG. 10, to provide increased surface area for the weld 322. As another example, as shown in FIG. 11, the weld joint 322 may be a lap weld joint, where the edges 308 and 310 are spaced apart from one another such that the adjacent portions 307 and 309 overlap, and the weld joint 322 may then be formed between one of the edges 308 or 310 and one of the adjacent portions 307 or 309. The weld 322 may be formed by any suitable welding process. For example, the butt weld joint of FIG. 10 may be formed by laser welding, arc welding, MIG welding, TIG welding, resistance welding, or any other suitable welding process. As another example, the lap weld joint of FIG. 11 may be formed by MIG welding, TIG welding, resistance welding, or any other suitable welding process.

As shown in FIGS. 12 and 13, in some embodiments, the seam 300 may be formed of overlapping and interlocking portions 307 and 309. The edges 308 and 310 may each be folded over, as best seen in FIG. 12, e.g., the bottom edge 308 may be folded over the first adjacent portion 307 and the top edge 310 may be folded over the second adjacent portion 309. The two folded-over portions may then be interlocked, e.g., folded together, to form the folded joint 324. Additionally, in some embodiments, a crimp 326 may be formed in at least one of the folded portions 307 or 309 at the folded joint 324, such that the seam 300 may be formed by a folded and crimped joint, e.g., as shown in FIG. 13. The crimp 326 may advantageously provide increased strength to the joint at the seam 300.

Figure 14:
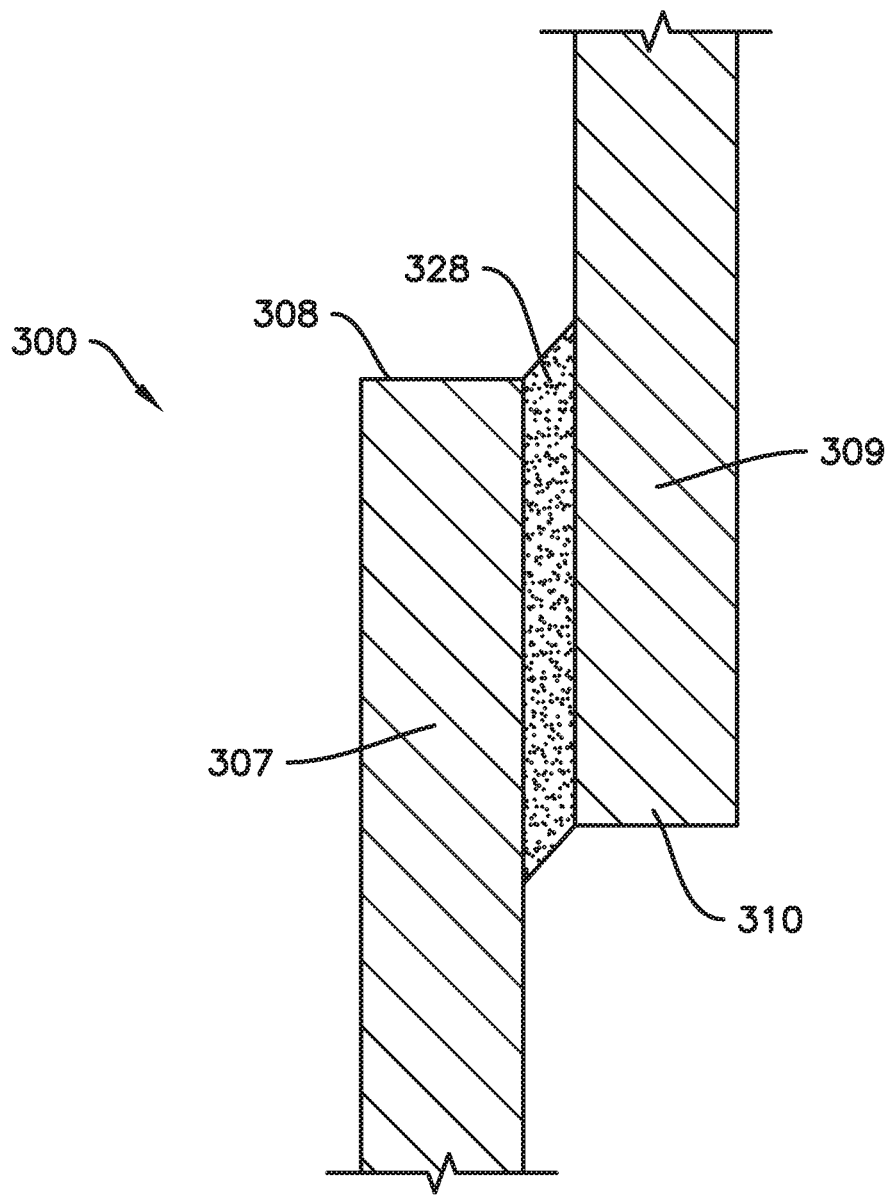
FIG. 14 provides a schematic illustration of an exemplary seam comprising an adhesive joint such as may be provided on the rotatable clothes vessel of FIG. 9 according to one or more exemplary embodiments of the present subject matter.

In other embodiments, the seam 300 may be formed with an adhesive joint, e.g., as illustrated in FIG. 14. In such embodiments, an adhesive 328 may be provided between the bottom edge 308 and the top edge 310 of the tube 303. For example, as shown in FIG. 14, the adjacent portions 307 and 309 may be overlapped and the adhesive 328 applied between the overlapped adjacent portions 307 and 309 to form the adhesive joint.

Figure 15:
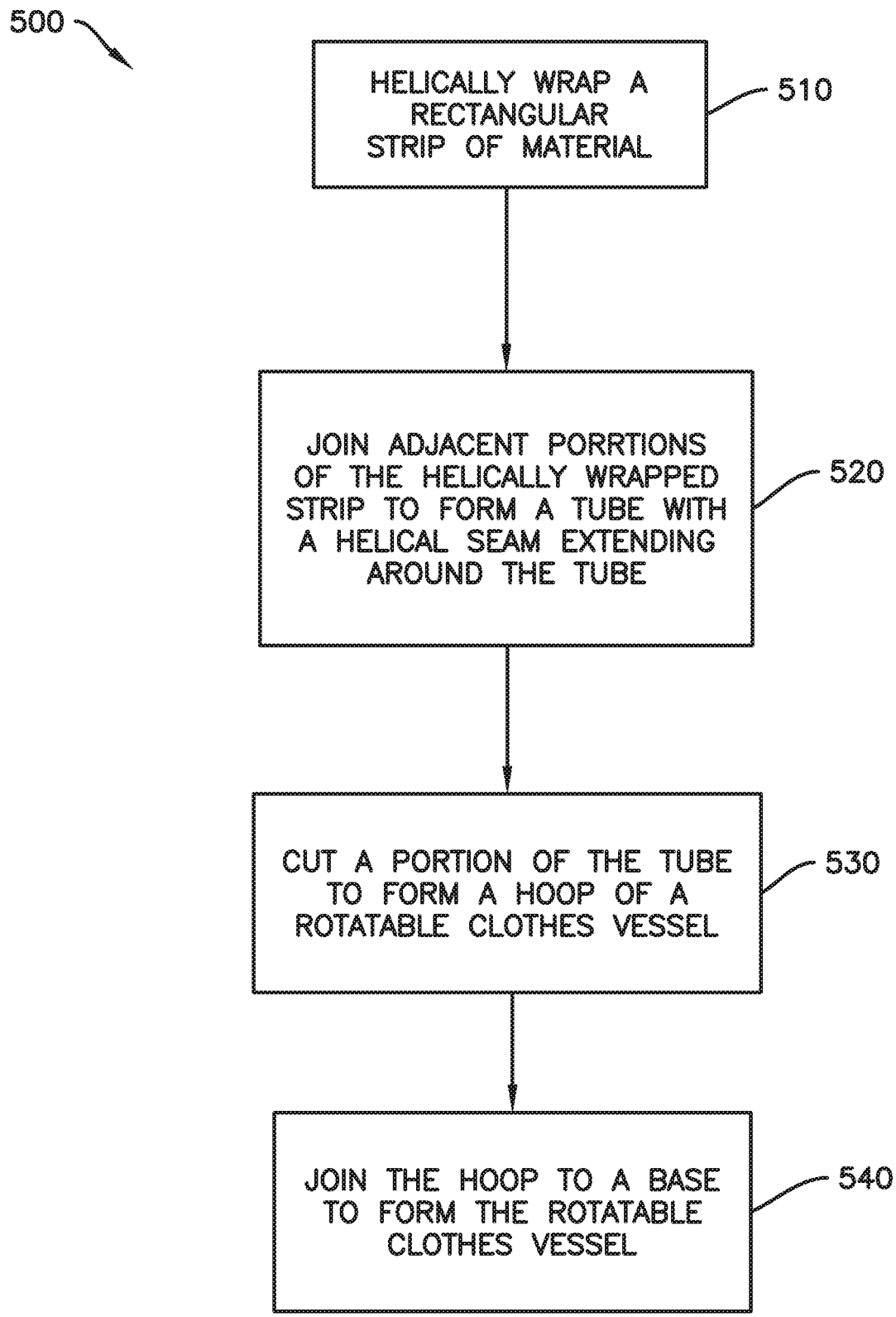
FIG. 15 provides a flow chart illustrating a method of making a rotatable clothes vessel for a laundry appliance according to one or more exemplary embodiments of the present subject matter.

Embodiments of the present disclosure may also include methods of making a rotatable clothes vessel for a laundry appliance, such as the exemplary method 500 illustrated in FIG. 15. For example, the method 500 may include a step 510 of helically wrapping a rectangular strip of material, such as the strip 302 illustrated in FIG. 7. The method 500 may also include a step 520 of joining adjacent portions of the helically wrapped strip to form a tube (e.g., the tube 303 of FIG. 8) with a helical seam, e.g., seam 300, extending around the tube. The method 500 may further include a step 530 of cutting a portion of the tube to form a hoop (e.g., hoop 318 in FIG. 9) of the rotatable clothes vessel and a step 540 of joining the hoop to a base to form the rotatable clothes vessel, for example, the hoop may be joined to a base such as the base 320 shown in FIG. 9 to form a rotatable clothes vessel such as vessel 316 of FIG. 9.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance defining a vertical direction, a lateral direction, and a transverse direction that are mutually perpendicular to one another, the laundry appliance comprising:
   a cabinet defining an opening; and
   a clothes vessel rotatably mounted within the cabinet, the clothes vessel comprising a base and a cylindrical hoop extending from a first end joined to the base to a second end proximate to the opening with a helical seam extending around the cylindrical hoop from the first end to the second end, the clothes vessel configured for receiving laundry articles to be rotated therein via the opening of the cabinet.

2. The laundry appliance of claim 1, wherein the helical seam comprises a weld joint.

3. The laundry appliance of claim 1, wherein the helical seam comprises a lap weld joint.

4. The laundry appliance of claim 1, wherein the helical seam comprises a butt weld joint.

5. The laundry appliance of claim 1, wherein the helical seam comprises a folded joint.

6. The laundry appliance of claim 1, wherein the helical seam comprises a folded and crimped joint.

7. The laundry appliance of claim 1, wherein the helical seam comprises a lapped joint with adhesive.

8. The laundry appliance of claim 1, wherein the laundry appliance is a dryer appliance and the clothes vessel rotatably mounted within the cabinet is a drum of the dryer appliance.

9. The laundry appliance of claim 1, wherein the laundry appliance is a washer appliance and the clothes vessel rotatably mounted within the cabinet is a basket of the washer appliance.

10. A method of making a rotatable clothes vessel for a laundry appliance, the method comprising:

helically wrapping a rectangular strip of material;

joining adjacent portions of the helically wrapped strip to form a cylindrical tube with a helical seam extending around the cylindrical tube;

cutting a portion of the tube to form a cylindrical hoop of the rotatable clothes vessel with a portion of the helical seam of the cylindrical tube extending around the cylindrical hoop from a first end of the cylindrical hoop to a second end of the cylindrical hoop; and joining the cylindrical hoop to a base at one of the first end of the cylindrical hoop or the second end of the cylindrical hoop to form the rotatable clothes vessel.

11. The method of claim 10, wherein joining adjacent portions of the strip comprises welding the adjacent portions.

12. The method of claim 10, wherein joining adjacent portions of the strip comprises overlapping the adjacent portions and welding the adjacent portions to form a lap weld joint.

13. The method of claim 10, wherein joining adjacent portions of the strip comprises welding abutting edges of the adjacent portions to form a butt weld joint.

14. The method of claim 10, wherein joining adjacent portions of the strip comprises folding the adjacent portions together to form a folded joint.

15. The method of claim 10, wherein joining adjacent portions of the strip comprises folding the adjacent portions together and crimping at least one of the folded portions to form a folded and crimped joint.

16. The method of claim 10, wherein joining adjacent portions of the strip comprises overlapping the adjacent portions and joining the overlapped adjacent portions with adhesive.

17. The method of claim 10, wherein the laundry appliance is a dryer appliance and the rotatable clothes vessel is a drum of the dryer appliance.

18. The method of claim 10, wherein the laundry appliance is a washer appliance and the rotatable clothes vessel is a basket of the washer appliance.

* * * * *